US007062131B2

(12) United States Patent
Ilchenko

(10) Patent No.: US 7,062,131 B2
(45) Date of Patent: Jun. 13, 2006

(54) OPTICAL COUPLING FOR WHISPERING-GALLERY-MODE RESONATORS VIA WAVEGUIDE GRATINGS

(75) Inventor: Vladimir Ilchenko, La Canada, CA (US)

(73) Assignee: OEwaves, Inc., Pasadena, CA (US)

( * ) Notice: Subject to any disclaimer, the term of this patent is extended or adjusted under 35 U.S.C. 154(b) by 52 days.

(21) Appl. No.: 10/886,009

(22) Filed: Jul. 6, 2004

(65) Prior Publication Data
US 2005/0147355 A1 Jul. 7, 2005

Related U.S. Application Data

(60) Provisional application No. 60/496,328, filed on Aug. 19, 2003, provisional application No. 60/485,173, filed on Jul. 3, 2003.

(51) Int. Cl.
*G02B 6/26* (2006.01)

(52) U.S. Cl. ............... 385/50; 385/37; 385/43; 385/28

(58) Field of Classification Search ............... 385/50, 385/37, 28, 43; 359/574; 372/94
See application file for complete search history.

(56) References Cited

U.S. PATENT DOCUMENTS 5,204,516 A * 4/1993 Opheij ............... 250/201.5
5,274,720 A * 12/1993 Yamamoto ............... 385/129
5,668,900 A * 9/1997 Little et al. ............... 385/37
5,723,856 A 3/1998 Yao et al.
5,777,778 A 7/1998 Yao
5,917,179 A 6/1999 Yao
5,929,430 A 7/1999 Yao et al.
6,178,036 B1 * 1/2001 Yao ............... 359/334
6,389,197 B1 5/2002 Iltchenko et al.
6,417,957 B1 7/2002 Yao
6,473,218 B1 10/2002 Maleki et al.
6,476,959 B1 11/2002 Yao
6,487,233 B1 11/2002 Maleki et al.
6,488,861 B1 12/2002 Iltchenko et al.
6,490,039 B1 12/2002 Maleki et al.
6,522,795 B1 * 2/2003 Jordan et al. ............... 385/10
6,535,328 B1 3/2003 Yao
6,567,436 B1 5/2003 Yao et al.
6,580,532 B1 6/2003 Yao et al.
6,594,061 B1 7/2003 Huang et al.
6,762,869 B1 7/2004 Maleki et al.
6,775,427 B1 * 8/2004 Evans ............... 385/14
2002/0018611 A1 2/2002 Maleki et al.
2003/0012504 A1 1/2003 Iltchenko
2005/0047705 A1 * 3/2005 Domash et al. ............... 385/10

FOREIGN PATENT DOCUMENTS
WO    WO0196936    12/2001

* cited by examiner

*Primary Examiner*—Rodney Bovernick
*Assistant Examiner*—Mike Stahl
(74) *Attorney, Agent, or Firm*—Fish & Richardson P.C.

(57) ABSTRACT

This application describes whispering gallery modes resonators that are optically coupled to one or two waveguide grating couplers formed on a substrate.

30 Claims, 13 Drawing Sheets

OPTICAL COUPLING FOR WHISPERING-GALLERY-MODE RESONATORS VIA WAVEGUIDE GRATINGS

This application claims the benefits of U.S. Provisional Patent Application Nos. 60/485,173 entitled "On-Chip Coupling Elements for High-Index Integrated Waveguides to High-Q Whispering-Gallery Modes in Silica and Other Low-Index Resonators" and filed Jul. 3, 2003, and 60/496,328 entitled "Mode-Matched Grating Waveguide Coupler" and filed Aug. 19, 2003.

The entire disclosures of the above two U.S. patent applications are incorporated herein by reference as part of the specification of this application.

The research and development for inventions described in this application received funding under BAA Contract No. DAAD17-02-C-0085 from ARL. The U.S. Government may have certain rights to various technical features described in this application.

BACKGROUND

This application relates to optical resonators and applications of such resonators.

Optical resonators may be used to spatially confine resonant optical energy in a limited cavity with a low optical loss. The resonance of an optical resonator may be used to provide various useful functions such as optical filtering, optical modulation, optical amplification, optical delay, and others. Light can be coupled into or out of optical resonators via various coupling mechanisms according to the configurations of the resonators. For example, Fabry-Perot optical resonators with two reflectors at two terminals may use partial optical transmission of at least one reflector to receive or export light. Whispering-gallery mode (WGM) resonators may use evanescent coupling for receiving or exporting light.

SUMMARY

This application describes, among others, techniques and devices that use a waveguide grating or a pair of waveguide gratings to couple light into and out of a WGM resonator. Examples of applications of such coupled WGM resonators are also described.

In one implementation, for example, a device may include a first waveguide having a first diffractive grating, and a second waveguide having a second diffractive grating. The first and second diffractive gratings are adjacent to and separated from each other without direct optical coupling and are configured to provide optical coupling from the first waveguide to a WGM resonator and optical coupling from the WGM resonator to the second waveguide when the WGM resonator is positioned above the first and second waveguides.

In another implementation, a device may include first and second waveguides, and an optical resonator. The first waveguide includes a first expanded section that has a first diffractive grating. The second waveguide includes a second expanded section that has a second diffractive grating. The second expanded section is located adjacent to and is separated from the first expanded section and is not optically coupled to each other. The optical resonator is located near the first and second expanded sections and optically coupled to the first and second waveguides via the first and the second diffractive gratings, respectively. The optical resonator supports whispering gallery modes and is in resonance with the first and the second diffractive gratings. An evanescent field of a WG mode has a spatial overlap with a mode in one of the first waveguide and the second waveguide.

In yet another implementation, a device may include a waveguide, a waveguide mode expander having a tapered shape with a narrow end coupled to one end of the waveguide and a broad end, and an expanded section coupled to the broad end of the waveguide mode expander and having a periodic grating structure in an elliptical shape. In general, the periodic grating structure is shaped to match a shape of an evanescent field outside a WGM resonator. A pair of waveguide gratings may be formed on a substrate to be adjacent to each other without direct optical coupling and the waveguide gratings may have a total spatial profile that matches the a shape of an evanescent field outside a WGM resonator that is optically coupled to both waveguide gratings.

This application further describes opto-electronic oscillators, electro-optic modulators, actively mode-locked lasers, optical frequency comb generators, and tunable optical filters based on a WGM resonator with a pair of waveguide gratings.

DETAILED DESCRIPTION

WGM resonators confine light in a whispering gallery mode that is totally reflected within a closed circular optical path. Unlike Fabry-Perot resonators, light in WGM resonators cannot exit the resonators by optical transmission. Light in a WGM resonator "leaks" out of the exterior surface of the closed circular optical path of a WGM resonator via the evanescence field of the WG mode. An optical coupler can be used to couple optical energy into or out of the WGM resonator by via this evanescent field. Angle-polished fiber tips, angle-polished waveguides, photonic bandgap materials, and GRIN lenses or prisms may be used as the optical couplers.

This application in part describes a pair of waveguide gratings as an optical coupler for a WGM resonator. Two waveguides may be fabricated on a substrate and a part of each waveguide include a Bragg waveguide grating. The two waveguide gratings may be parallel to each other and are spatially separated to prevent any significant direct coupling without the WGM resonator. The WGM resonator is positioned above the two waveguide gratings and is oriented to place the plane, in which the closed circular optical path for a WG mode is located, to be perpendicular to the substrate surface. One waveguide grating is configured as an input coupler to couple light into a WG mode of the WGM resonator while the other waveguide grating is configured as an output coupler to coupling light out of the WGM resonator. The two waveguide gratings may be mode matched to the same WG mode or to two different WG modes (e.g., two counter-propagating WG modes).

Figure 1:
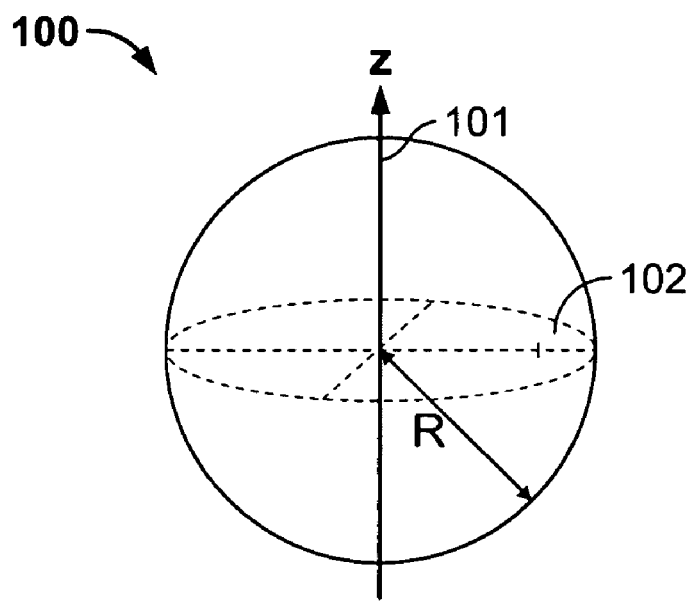
FIGS. 1, 2, 3, 4A, and 4B illustrate examples of WGM resonators in different configurations.
Figure 2:
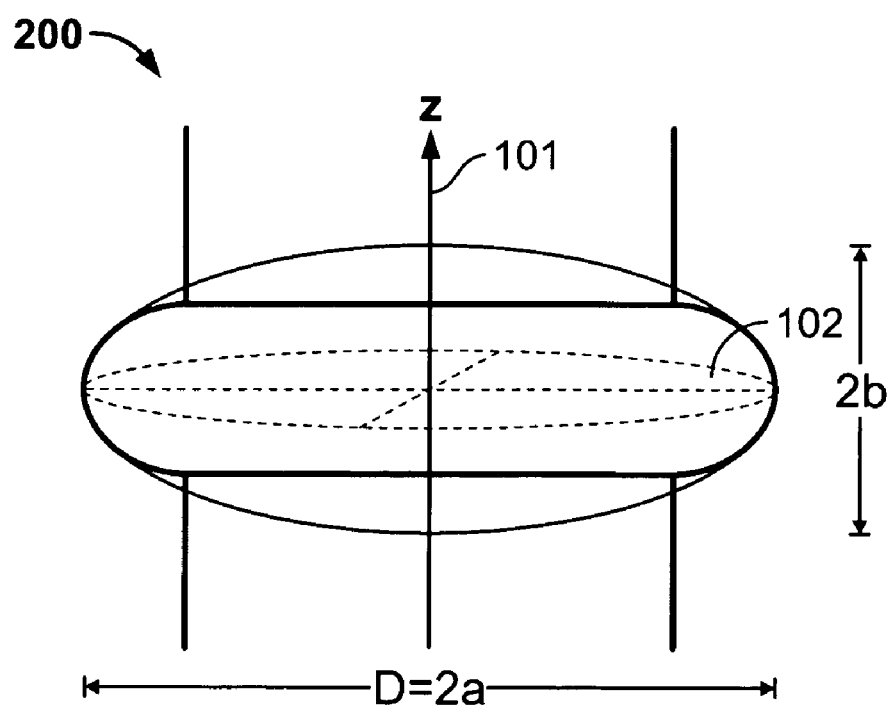
Figure 3:
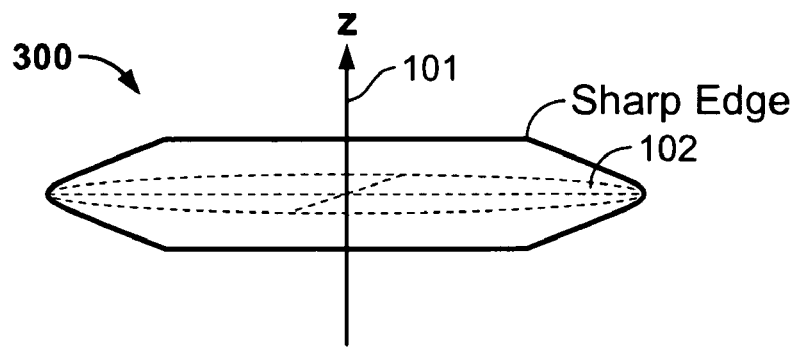

WGM resonators suitable for the above and other waveguide grating couplers may be made in different geometries. Such WGM resaontors support a circular optical path with exterior curved surfaces to spatially confine the modes in the direction perpendicular to the plane in which the circular optical path is located. FIGS. 1, 2, and 3 illustrate three exemplary geometries for implementing WGM resonators.

FIG. 1 shows a spherical WGM resonator 100 which is a solid dielectric sphere. The sphere 100 has an equator in the plane 102 which is symmetric around the z axis 101. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheriodal microresonator 200. This resonator 200 may be formed by revolving an ellipse (with axial lengths a and b) around the symmetric axis along the short elliptical axis 101 (z). The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
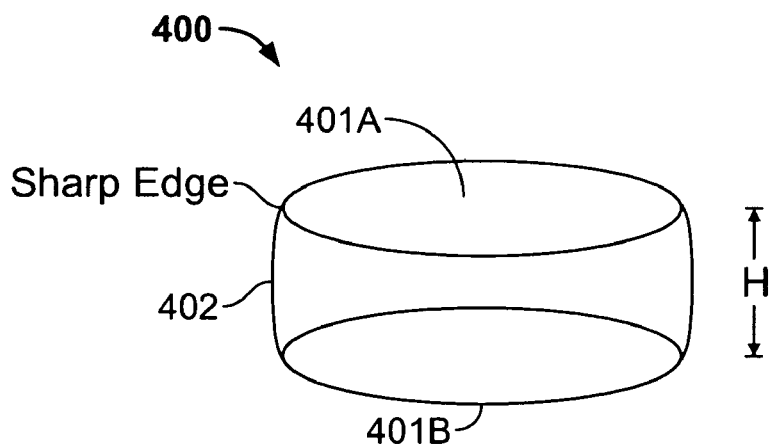
Figure 4B:
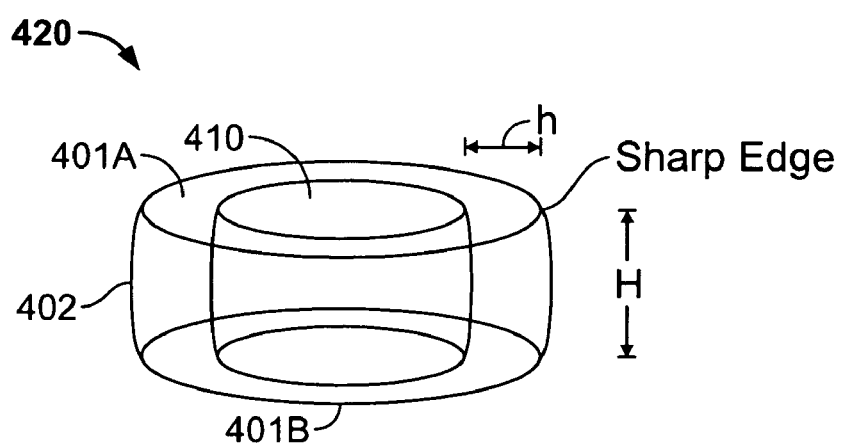

FIGS. 4A and 4B show a disk-shaped WGM resonator 400 and a ring-shaped WGM resonator 420, respectively. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3C, 4A and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since, the WG modes are present near the exterior part of the ring 420 near the exterior surface 402, the thickness h of the ring may be set to be sufficiently large to support the WG modes.

Figure 5:
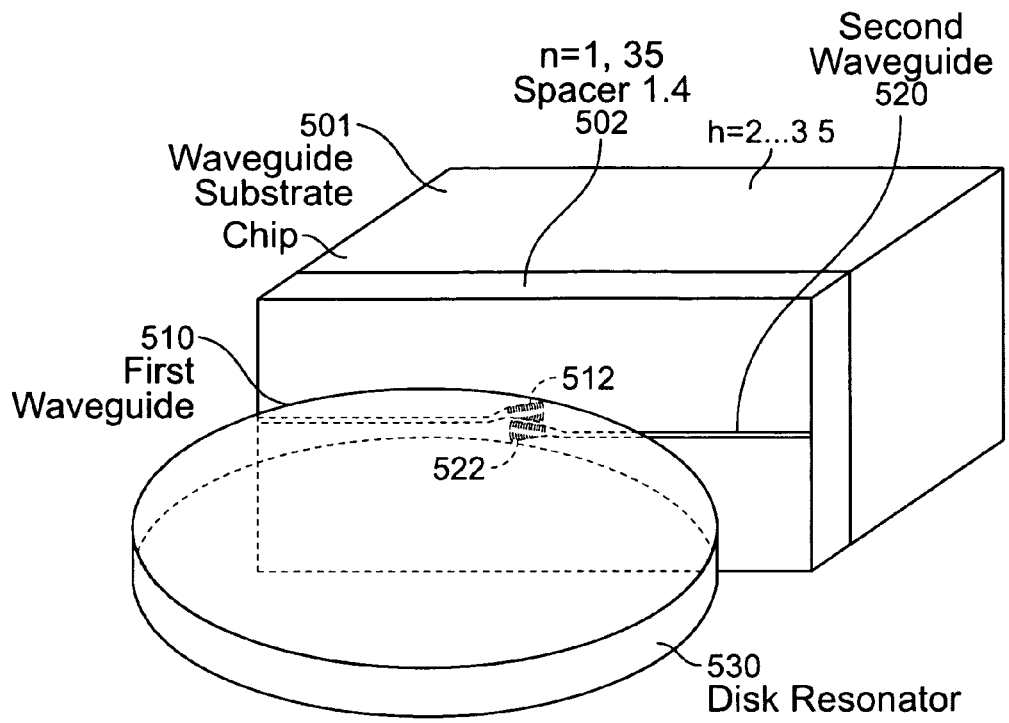
FIG. 5 shows an example of a pair of waveguide gratings as an optical coupler for a disk WGM resonator.
Figure 6:
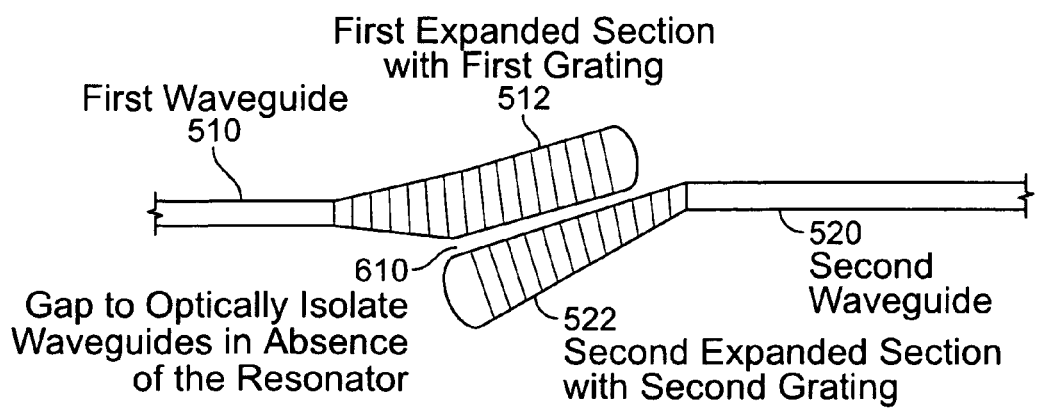
FIG. 6 shows details of the waveguide gratings in FIG. 5.

FIGS. 5 and 6 illustrate a device with a WGM resonator 530 coupled to a pair of waveguide gratings 512 and 522 formed on a substrate 501. The WGM resonator 530 as illustrated is a disk resonator but other WGM resonator geometries may also be applicable. The substrate 501 may be formed of any suitable substrate material such as semiconductors, glasses, and others. The WGM resonator 530 may be formed of an optical material. The WGM resonator 530 and the substrate 501 may be formed of different materials and thus, in absence of the waveguide gratings, there is a mode mismatch between the a guided mode on the substrate and a WG mode in the WGM resonator 530. As an example, the substrate 501 may be made of a high-index semiconductor material such as silicon, InP, or GaAs and the WGM resonator 530 may be made of a glass material (e.g., silica) or a crystal (e.g., sapphire, lithium niobate). The waveguide gratings 512 and 522 are specifically designed to provide the mode matching between the light guided in each waveguide grating and light confined in a WG mode in the WGM resonator 530 for efficient optical coupling.

The waveguide gratings 512 and 522 are parallel to each other and are respectively formed in two different waveguides 510 and 520. The waveguide gratings 512 and 522 are separated from each other by a gap 610 to prevent direct optical coupling in absence of the WGM resonator 530. Each waveguide has a waveguide portion for guiding light and an expanded section in which a Bragg grating is fabricated for coupling with the WGM resonator 530. The expanded section in each waveguide is designed to have a spatial extent that is equal to or greater than the spatial extent of the evanescent field outside the exterior surface of the WGM resonator 530 because the waveguides 510 and 520 are generally narrower than the spatial extent of the evanescent field outside the exterior surface of the WGM resonator 530. The transition between each waveguide and the expanded section may be a gradual transition to allow the guided mode to adiabatically expand or contract without significant loss of energy. The two waveguide gratings 512 and 522 may have identical grating periods for coupling with the same WG mode. Alternatively, the two waveguide gratings 512 and 522 may have different grating periods to match and couple with different WG modes.

The WGM resonator 530 is oriented to place the plane of the closed circular optical path of each WGM mode to be parallel to the grating directions of the waveguide gratings and perpendicular to the substrate surface. In the example of the disk resonator shown in FIG. 5, the disk resonator is positioned above the waveguide gratings 512 and 522 and is perpendicular to above the substrate 501.

As illustrated in FIG. 5, a spacer layer 502 with a refractive index less than the WGM resonator 530 may be formed above the waveguides 510 and 520 to separate the WGM resonator 530 and the waveguide gratings 512 and 522 at a desired distance for optimized coupling. For example, when the WGM resonator 530 is made of a silica glass or another glass material with a refractive index around 1.5, the spacer layer 502 may be a dielectric material with an index less than 1.5 (e.g., from about 1.35 to about 1.4) and the substrate 501 may be a high-index material with an index from about 2 to about 3.5.

In implementation, a collinear expanded waveguide may be combined with corrugated surfaces to form a diffractive, or one-dimensional grating in order to facilitate efficient coupling of high-index integrated waveguides to the high-Q whispering-gallery (WG) modes of silica micro-resonators, and back into the waveguides. The two waveguides that would normally be uncoupled can exchange energy via the whispering-gallery modes when a silica resonator is placed in the vicinity of the waveguides. The resonance coupling can be enabled by 1) quasi-phase-matching achieved by means of grating, and 2) by modal overlap of each waveguide to one and the same WG mode in silica resonator. Period of the grating, as well as waveguide mode expander parameters are defined by the operational wavelength and the particular indices of refraction, typically from about 0.5 micron to about 3 microns for the grating period and from about 2 to 10 microns for the expanded waveguide width at the wavelength at 1550 nm in some applications. The whole system may constitute an optical filter compatible with other on-chip optical elements. Both band-pass and band-rejection filters can be implemented, and also co-directional and counter-directional configurations achieved by the choice of the grating periods of the two waveguide gratings. The design may be applicable to the range of waveguide materials such as Si or InP, as well as choice of resonator materials such as e.g. silica, sapphire or lithium niobate.

Figure 7:
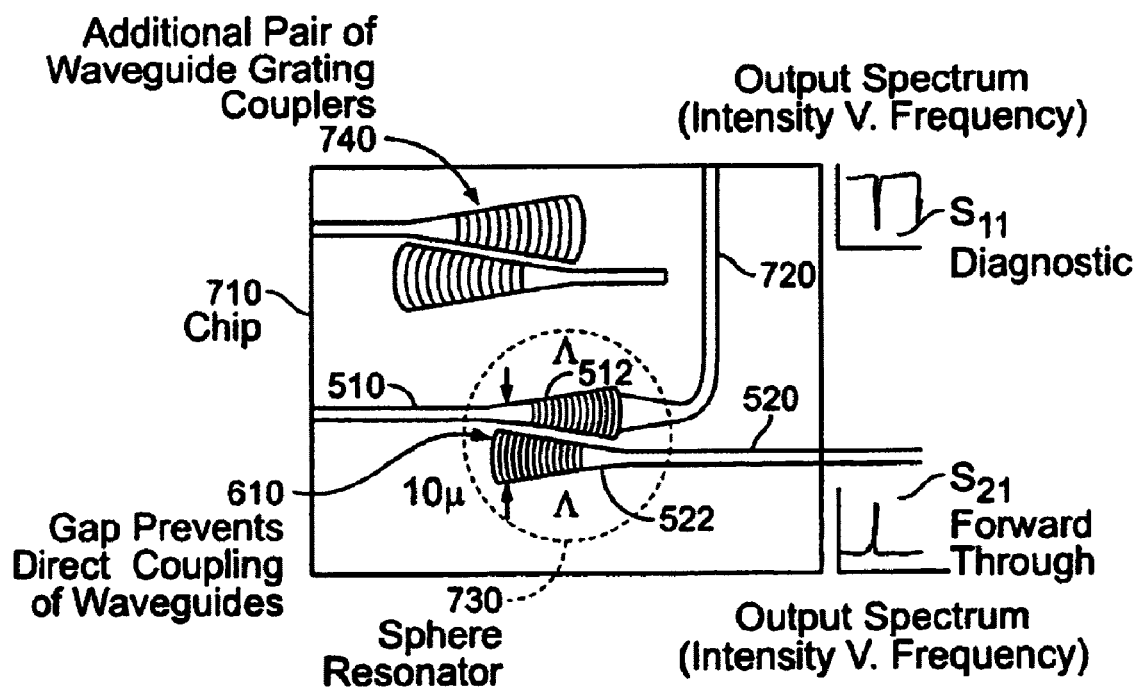
FIGS. 7 and 8 show two different configurations of optical couplers each with a pair of waveguide gratings.

FIG. 7 shows a chip 710 that is fabricated to have at least two pairs of waveguide grating couplers for coupling two different WGM resonators on the same chip 710. A WGM sphere resonator 730 is shown, as an example, to be coupled to two grating couplers 512 and 522 with the same grating period $\Lambda$. Hence, the same WG mode in the WGM resonator 730 is mode matched with the two gratings 512 and 522. The guided light waves in both waveguide gratings 512 and 522 are in the same direction.

In FIG. 7, the input waveguide 510 is shown to include a forward-through waveguide 720 to receive remaining light that is not coupled into the WGM resonator 730 at the waveguide grating 512. The output light in the waveguide 720 has a dip in the output spectrum at each resonant frequency of the WGM resonator 730. In comparison, the output of the output waveguide 520 shows a peak at each resonant frequency of the WGM resonator 730.

Figure 8:
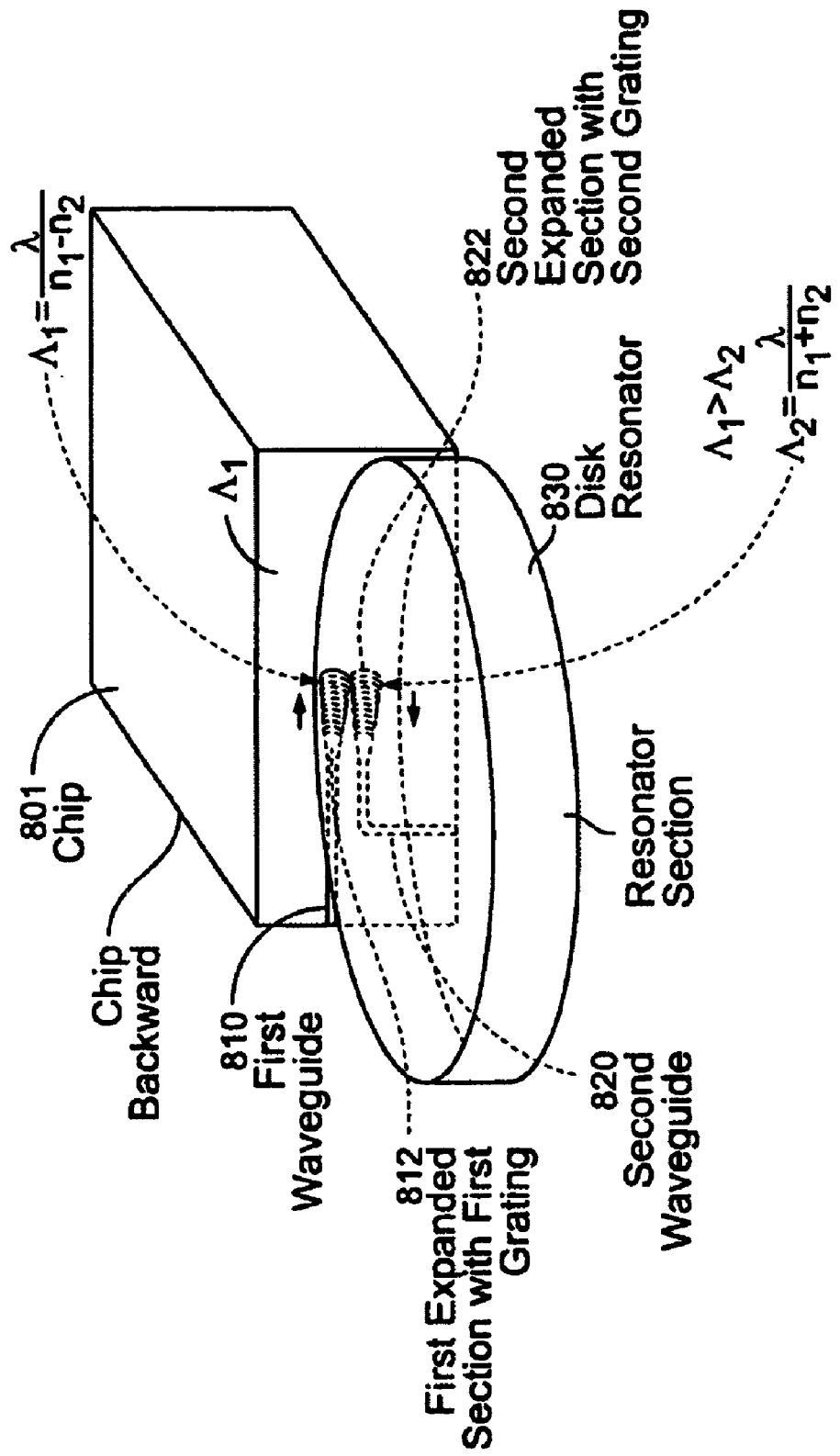

FIG. 8 shows another chip 801 with a pair of waveguide gratings 812 and 822 with different grating periods in a counter-propagation configuration. The input waveguide 810 includes an expanded section with the waveguide grating 812 to couple light into a first WG mode in the WGM resonator 830. The output waveguide 820 includes an expanded section with the waveguide grating 822 to couple light from a second WG mode in the WGM resonator 830. The two WG modes are counter propagating. As illustrated, the grating period for the input grating coupler 812 is $\Lambda_1 = \lambda/(n1-n2)$ where n1 is the effective index of the waveguide grating and n2 is the effective index of the WGM resonator 839 and the grating period for the output grating 822 is $\Lambda_2 = \lambda/(n1+n2)$. Hence, the input grating period is greater than the grating period for the output grating coupler 822.

Bragg gratings formed in waveguides and fibers usually have a rectangular profile when viewed from the side of the waveguide and fiber. The evanescent field outside of a WGM resonator, however, is not rectangular in general. In addition to achieving the phase matching between resonator WG modes and the modes of expanded integrated waveguides, experiments indicated the grating profile may be shaped to match the non-rectangular shape to improve the coupling efficiency under a mode-matched or quasi-mode-matched condition. Since the cross sectional spatial profile of an evanescent field of a WG mode outside a WGM resonator is essentially elliptical, the grooves of the grating can be fabricated in such a way so as to form elliptical interaction area. This grating design can minimize optical reflection back to the waveguide and provides improved matching of the coupler to the elliptical overlap area of resonator WG modes' evanescent field with the plane of the coupler.

In addition, the depth of the grating grooves may also be modulated along the direction that is perpendicular to the substrate surface to form a two-dimensional Gaussian profile to substantially match, and preferably exactly coincide with, the WG modes' evanescent field intensity at the plane of the waveguide grating coupler.

Figure 9:
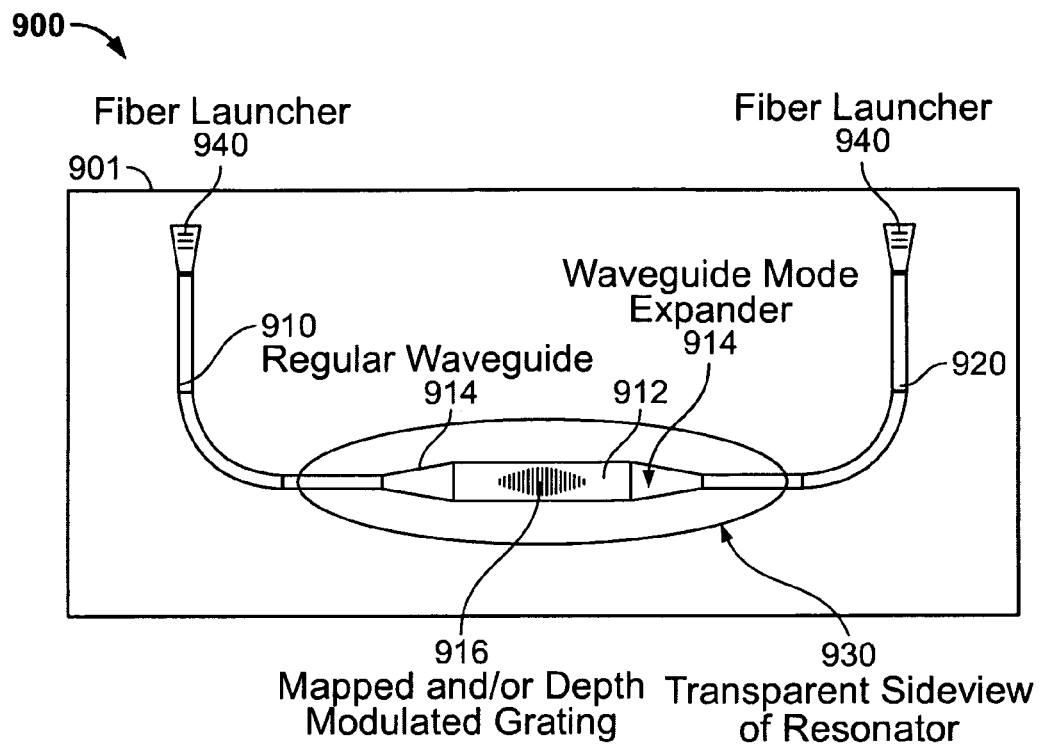
FIGS. 9 and 10 show examples of Bragg gratings in waveguides as optical couplers for WGM resonators that have spatial profiles tailored to match spatial profiles of evanescent fields outside WGM resonators.
Figure 10:
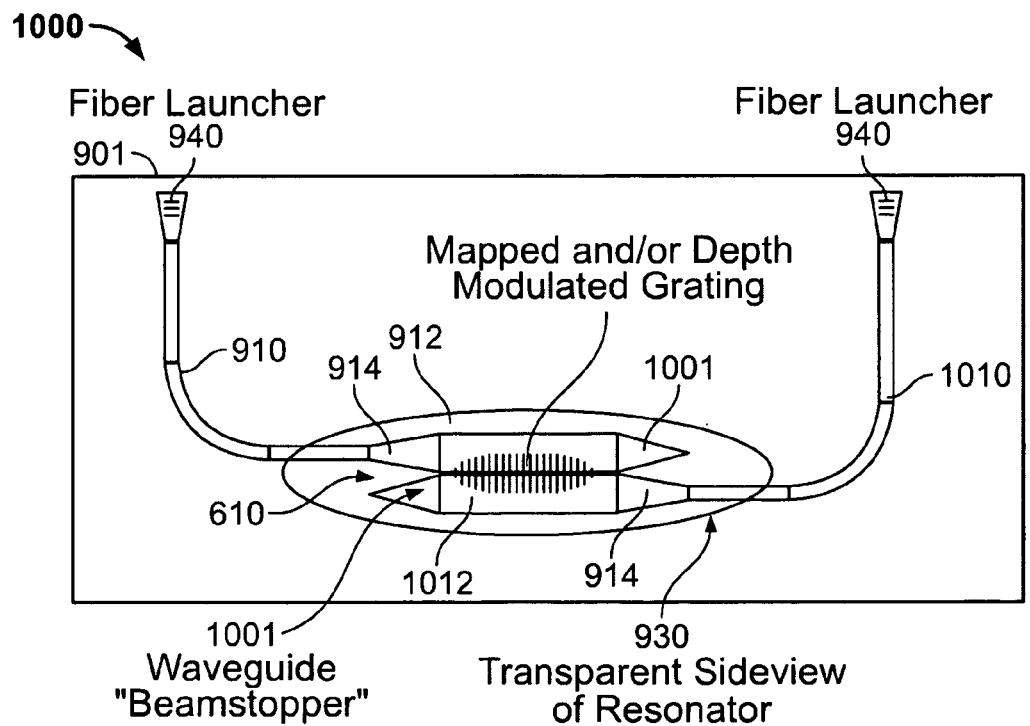

FIGS. 9 and 10 illustrate two examples of waveguide grating couplers with specially shaped Bragg gratings. FIG. 9 shows an exemplary waveguide grating coupler 900 on a substrate 901 with a single waveguide grating 916 formed in an expanded waveguide section 912. The Bragg grating grooves are shaped in the plane parallel to the substrate surface to match the shape of the evanescent field of a WGM resonator 930. In the illustrated example, the grating grooves 916 have an elliptical shape. In addition, the depth of the grating grooves may also be spatially modulated to also match the spatial profile of the evanescent field along the direction perpendicular to the substrate surface.

In FIG. 9, the waveguide grating section 912 is coupled to an input waveguide 910 and an output waveguide 920 through waveguide mode expanders 914 which are gradually tapered to minimize the optical loss when spatially changing the guided mode profile. In addition, two fiber launchers 940 may be optionally formed at the input port of the waveguide 910 and the output port of the waveguide 920 to couple light into the waveguide 910 from an input fiber and to couple output light from the waveguide 920 to an output fiber. The fiber launchers 940 may be diffraction gratings to direct light from an direction above the substrate 901 into a direction that is parallel to the substrate 901 or vice versa when the input and output fibers are positioned above the substrate 901.

FIG. 10 shows an exemplary waveguide grating coupler 1000 on a substrate 901 with a pair of waveguide grating couplers formed in two expanded waveguide sections 912 and 1012, respectively. The expanded waveguide sections 912 and 1012 are adjacent to each other for optical coupling with the WGM resonator 930 and are separated by a gap 610 to prevent direct optical coupling in absence of the resonator 930. Different from the waveguide grating coupler 900 in FIG. 9, the two separate Bragg gratings respectively in the two sections 912 and 1012 are shaped as a whole to match the spatial profile of the evanescent field of the WGM resonator 930. When the spatial profile of the evanescent field is an ellipse, each grating is shaped as a half ellipse. The depth of the grating grooves may also be modulated as described above. The grating 1012 is coupled to an output waveguide 1010. Two waveguide beam stoppers 1001 may be formed in the sections 912 and 1012 to prevent any undesired optical reflections.

The above waveguide grating couplers may be used in various integrated photonic devices with WGM resonators. Several examples are described below.

Figure 11:
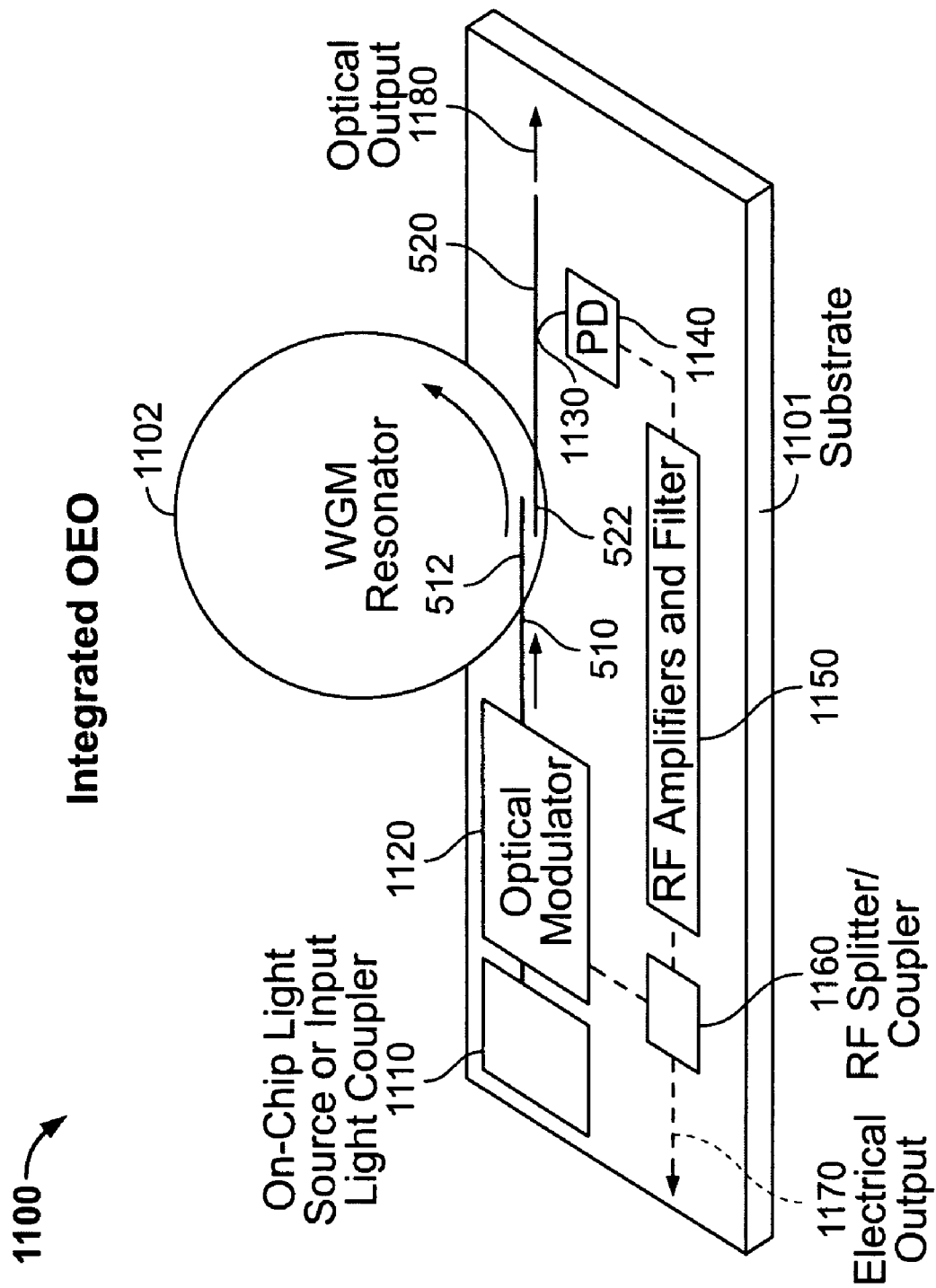
FIGS. 11 and 12 show examples of opto-electronic oscillators that implement a pair of waveguide gratings for coupling with a WGM resonator in the optical section of an opto-electronic feedback loop.
Figure 12:
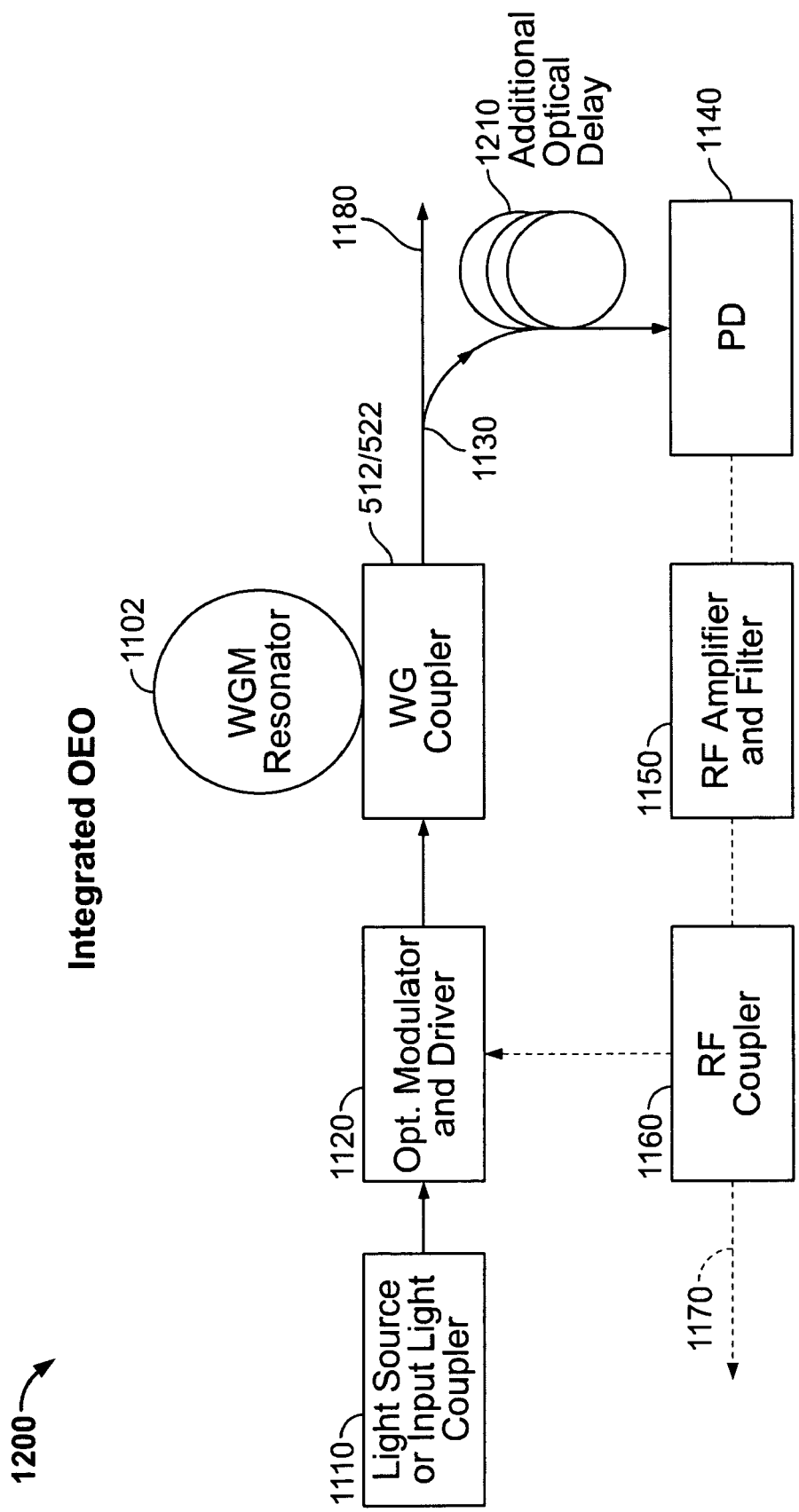

FIGS. 11 and 12 illustrate opto-electronic oscillators (OEO) that implement a pair of the waveguide gratings described above. An OEO may be designed to include at least one closed loop to generate a desired oscillation signal. Some examples of such an OEO are described in, e.g., U.S. Pat. No. 5,723,856 to Yao and Maleki, U.S. Pat. No. 5,777,778 to Yao, U.S. Pat. No. 5,929,430 to Yao and Maleki, and U.S. Pat. No. 6,567,436 to Yao, Maleki, and Ilchenko. In these examples, an OEO includes an electrically controllable optical modulator and at least one active opto-electronic feedback loop that comprises an optical part and an electrical part interconnected by a photodetector. The opto-electronic feedback loop receives the modulated optical output from the modulator and converted it into an electrical signal to control the modulator. The loop produces a desired delay and feeds the electrical signal in phase to the modulator to generate and sustain both optical modulation and electrical oscillation in radio frequency spectrum when the total loop gain of the active opto-electronic loop and any other additional feedback loops exceeds the total loss.

OEOs use optical modulation to produce oscillations in frequency spectral ranges that are outside the optical spectrum, such as in the RF and microwave frequencies. The generated oscillating signals are tunable in frequencies and can have narrow spectral linewidths and low phase noise in comparison with the signals produced by other RF and microwaves oscillators. Notably, the OEOs are optical and electronic hybrid devices and allow for versatile applications.

Notably, a high-Q optical resonator may be disposed in the optical part of the opto-electronic feedback loop or in another optical feedback loop coupled to the opto-electronic feedback loop, to provide a sufficiently long energy storage time and an optical filtering mechanism to produce an oscillation of a narrow linewidth and low phase noise. The mode spacing of the optical resonator is equal to one mode spacing, or a multiplicity of the mode spacing, of the opto-electronic feedback loop. In addition, the oscillating frequency of the OEO is equal to one mode spacing or a multiple of the mode spacing of the optical resonator. The above cited U.S. Pat. No. 6,567,436 describes examples of OEOs with at least one optical resonator in the optical part of the opto-electronic feedback loop. The optical resonator may be implemented a WGM resonator such as microsphere, microdisk, and microring WGM resonators. Nonspherical WGM resonators may be used.

FIG. 11 shows an integrated OEO 1100 where the OEO feedback loop is built on a substrate 1101 and a WGM resonator in the optical section of the feedback loop is placed above the substrate 1101 and is optically coupled to the optical section of the loop via a pair of the waveguide gratings 512 and 522 based on the design, e.g., in FIG. 7 or FIG. 10. An optical modulator and its on-chip driver 1120 are used to receive CW input light from an on-chip light source (e.g., a diode laser) or an input light coupler 1110. The input light coupler 1110 may be a grating coupler as shown in FIGS. 9 and 10 to allow for optical coupling with a fiber above the substrate 1101. A waveguide optical coupler 1130 is coupled to the output waveguide 520 to direct a portion of light to a photodetector 1140 on the substrate 1101. The output waveguide 520 directs the rest of light as the optical output 1180 for the OEO 1100. An electronic RF feedback block 1150, which may include RF amplification and filtering, is used to send the output of the detector 1140 to a signal coupler 1160. The coupler 1160 directs a portion of the signal as the electrical output 1170 of the OEO 1100 and feeds the rest of the signal as a modulation feedback control signal to the optical modulator 1120.

FIG. 12 shows an OEO based on the OEO 110 with an additional optical delay 1210 between the coupler 1130 and the photodetector 1140. The additional optical delay 1210 may be another optical resonator or a fiber delay loop. In other implementations, more than one OEO feedback loop may be integrated in FIGS. 11 and 12. The substrate 1101 may be a Si or silicon-on-insulator substrate so that the feedback loop may be fabricated by using silicon fabrication techniques such as CMOS fabrication. Therefore, all components may be made by using the silicon CMOS technology and the RF circuits and the optics are integrated on the same chip. The photodetector may be a monolithically integrated detector.

Figure 13:
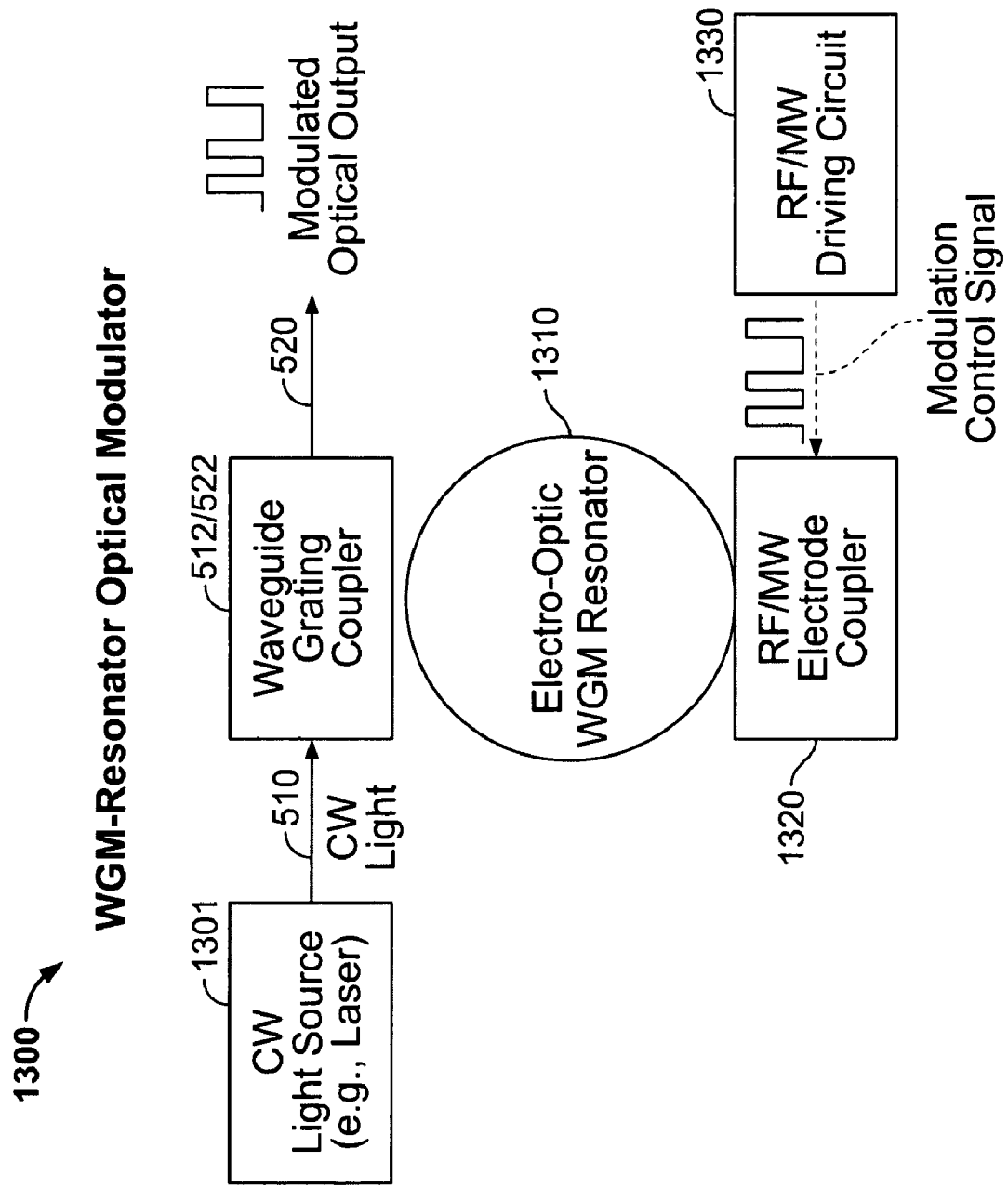
FIGS. 13, 14A, and 14B illustrate an example of an electro-optic modulator that uses a WGM resonator formed in an electro-optic material and a pair of waveguide gratings to modulate light.

FIG. 13 shows an example of an optical modulator 1300 that uses a WGM resonator 1310 which exhibits an electro-optic effect. Examples of the suitable materials for the electro-optic effect include but are not limited to an electro-optic crystal such as Lithium Niobate and semiconductor multiple quantum well structures. The index of the resonator 1310 in the path of the WG modes is modulated via the electro-optic effect to change the total optical delay in the resonator so that the operation changes between a resonance condition and a non-resonance condition. The initial value of the optical delay (i.e. detuning from resonance) may be biased at a value where a change in the phase delay produces the maximum change in the output energy. An external electrical signal is used to modulate the optical phase in the resonator to shift the whispering-gallery mode condition and hence the output coupling. Such an optical modulator can operate at a low operating voltage, in the millivolt range. This can achieve a high modulation speed at tens of gigahertz or higher, and have a compact package. The optical coupling with the resonator may be implemented with waveguides or fibers for integration with other fiber optical elements or integrated electro-optical circuits formed on substrates. Hence, such optical modulators may be used in a variety of applications having optical modulation, including optical communication and optical signal processing.

In the modulator 1300 in FIG. 13, a pair of waveguide grating couplers 512 and 522 or other waveguide grating coupler may be used for coupling CW light into the electro-optic WGM resonator 1310 and producing a modulated output. A CW light source 1301 may be used to produce the CW light for modulation. An electrode coupler 1320 is disposed near the resonator 1310 to couple an electrical modulation control signal to cause a change in the dielectric constant due to the electro-optic effect. An electronic driving circuit 1330 is coupled to supply the modulation control signal to the electrical coupler 1320.

Figure 14A:
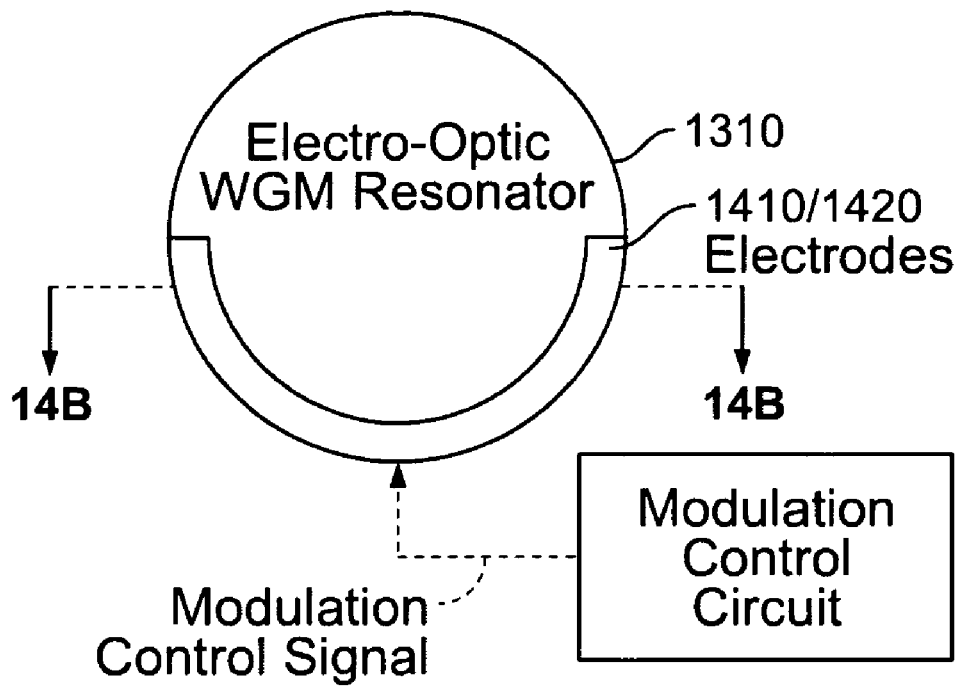
Figure 14B:
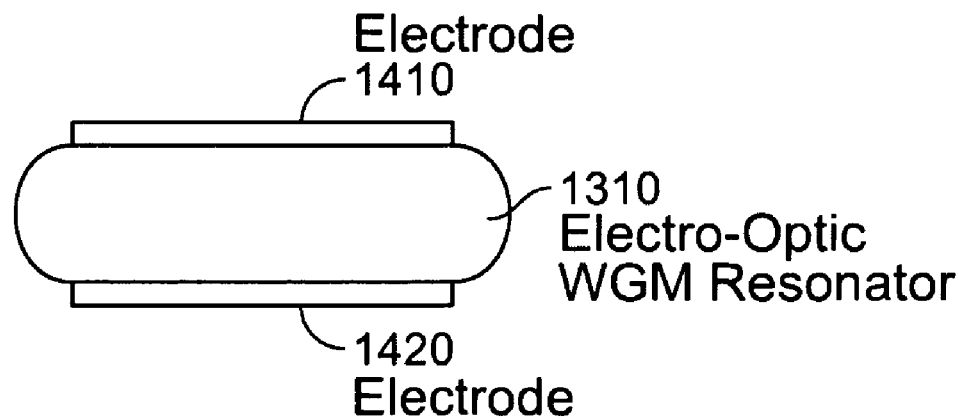

FIGS. 14A and 14B show one implementation of the electrode coupler 1320. Electrodes 1410 and 1420 may be formed on the resonator 1310 to apply the control electrical field in the region where the WG modes are present to control the index of the electro-optical material The electrodes 1410 and 1420 may be strip electrodes to form a RF or microwave (MW) resonator SO that the electrical and the optical field co-exist in the optical path of the WG modes.

The optical modulator in FIG. 13 may also be operated as an optical frequency comb generator. The optical modulation produces multiple modulation sidebands that are the comb in the frequency domain. Such modulated light is then coupled as the pulsed optical output. This comb generator uses the electro-optic WGM resonator modulator outside the laser resonator in the laser 1301. The comb generator can produce a comb of optical harmonics due to the electro-optic modulation. Different from conventional WGM resonators, the WGM resonator 1310 in the device provides special features. First, WG modes of the WGM resonator 1310 have a high finesse. Second, the geometrical dispersion introduced by the cavity structure is generally small compared with the material dispersion. Therefore, the number of harmonics produced by the modulation in WGM resonator 1310 may be as large as in a Fabry-Perot resonator with a conventional electro-optic modulator inside.

Figure 15:
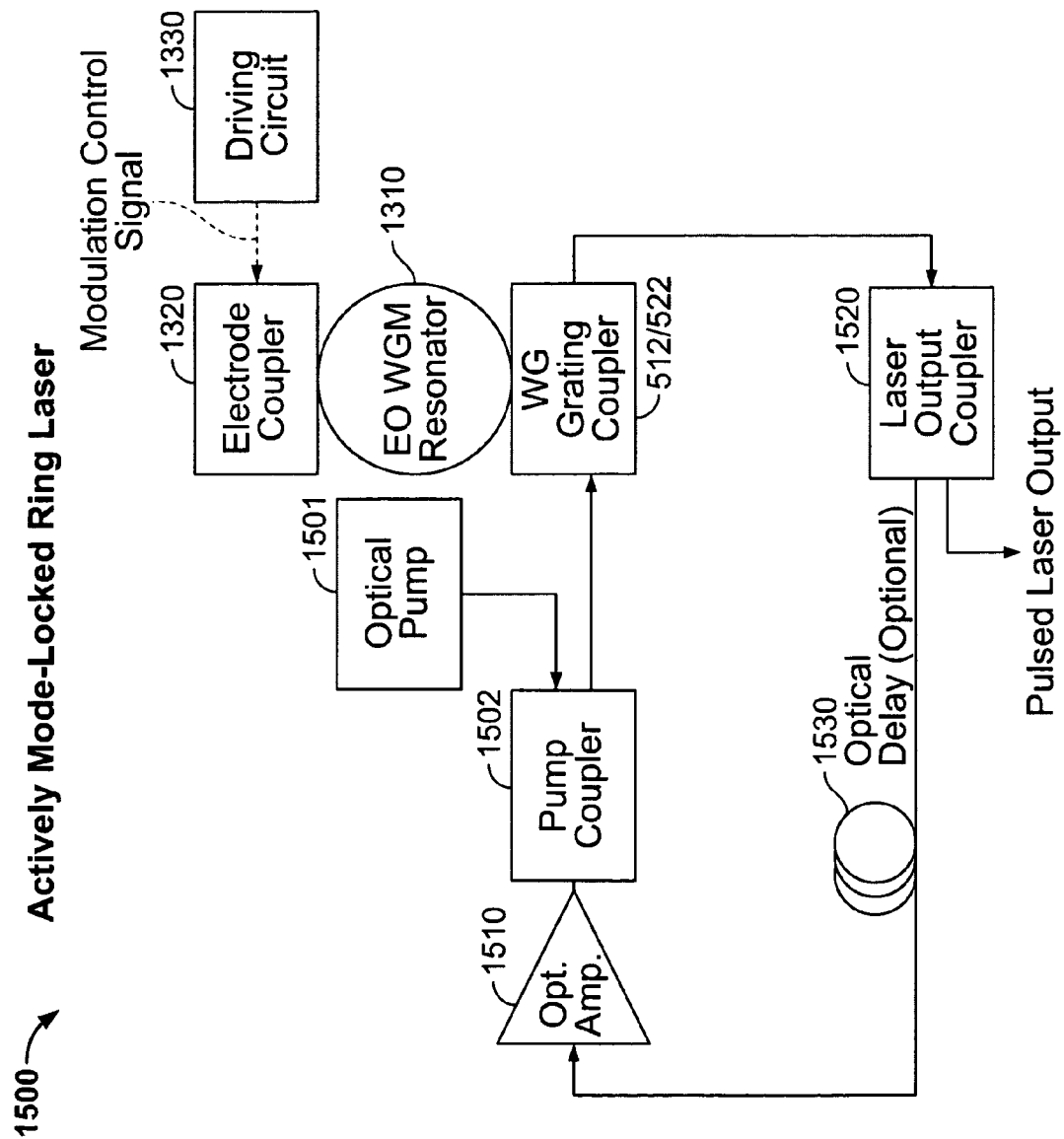
FIGS. 15, 16, 17, and 18 show exemplary applications of an electro-optic WGM resonator and a pair of waveguide gratings in actively mode-locked lasers, coupled opto-electronic oscillators, and tunable optical filtering.

FIG. 15 shows an exemplary actively mode-locked ring laser 1500 having a closed optical ring and an optical amplifier 1510 in the ring. The optical amplifier 1510 may be an electrically-energized semiconductor optical amplifier or an optically-pumped optical amplifier. The illustrated implementation of the amplifier 1510 for the ring laser 1500 is an optically pumped laser gain medium such as an Er-doped waveguide optical amplifier (EDFA) for absorbing pump light at a pump wavelength to produce laser gain at a laser wavelength. A wavelength-selective optical coupler 1502 is coupled near the amplifier 1510 to inject a pump beam at the pump wavelength from a pump light source 1501 into the ring to pump the amplifier 1510. The ring may be a waveguide ring on a substrate. The length of the ring may be set to achieve a desired total cavity length or optical delay for the laser 1500. The laser 1500 implements the electro-optic WGM resonator modulator shown in FIG. 13 to achieve desired active mode locking. The WGM modulator can improve performance of the actively mode locked laser because it can produce significant modulation with low power microwave pump at very high microwave frequencies. Notably, the WGM modulator not only modulates light but also operates as an intracavity etalon within the ring cavity to select the proper mode or modes to oscillate in the ring. A laser output coupler 1520 is coupled in the ring to produce the pulsed laser output. The resonator 1310 further operates an optical delay in the ring laser 1500. An additional optical delay 1530 may be coupled in the ring to provide additional delay. Another passive WGM resonator may be used in the delay 1530.

Figure 16:
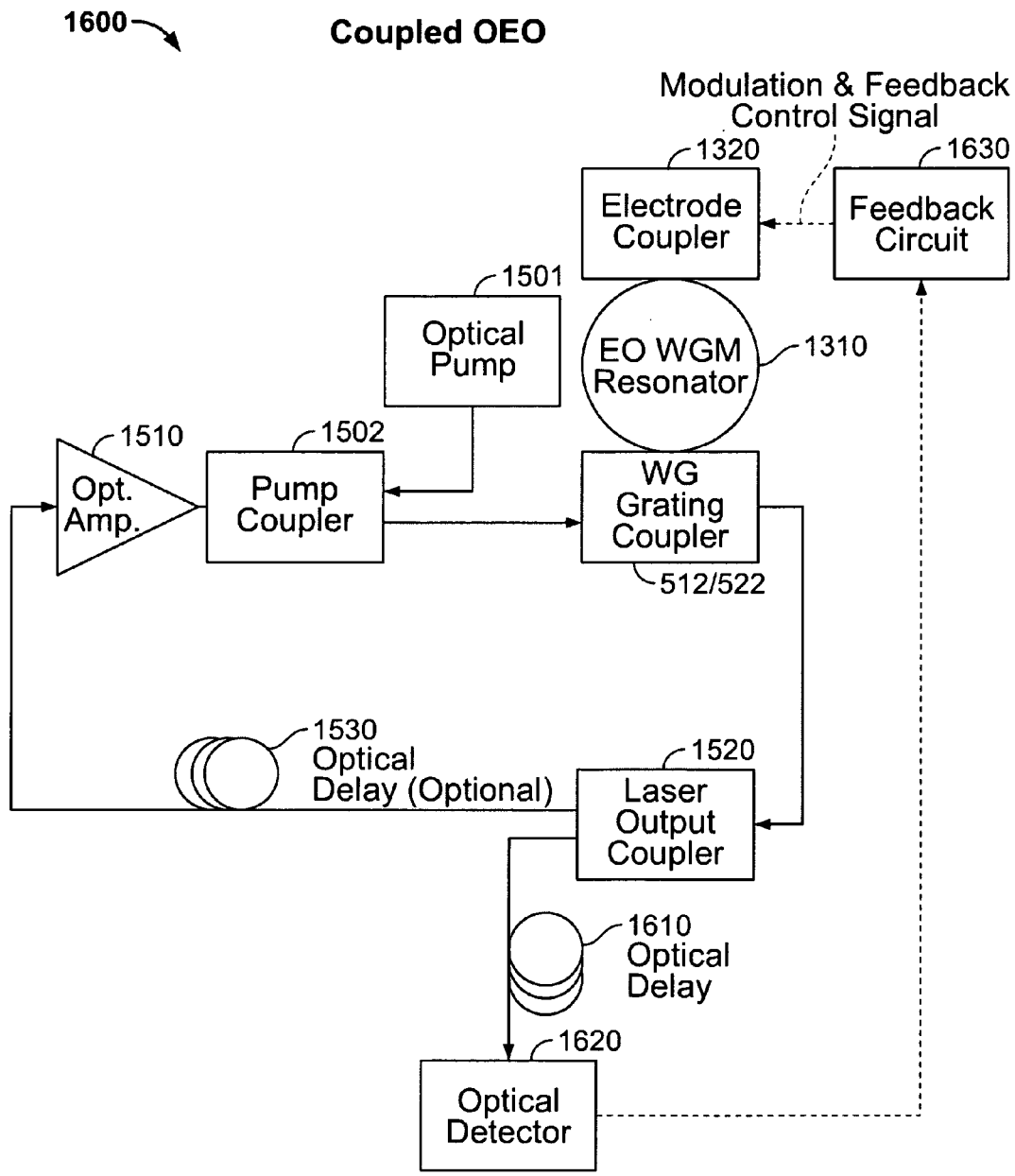

FIG. 16 shows an example of a coupled opto-electronic oscillator (COEO) 1600 having an electro-optic WGM resonator modulator 1310. Examples of COEOs and their operations are described in U.S. Pat. Nos. 5,929,430 and 6,567,436. In general, a COEO directly couples a laser oscillation in an optical feedback loop or a laser cavity to an electrical oscillation in an opto-electronic feedback loop. The opto-electronic loop generally includes an optical section and an electronic section that are interconnected by an optical detector. The optical section may be used to provide a long loop delay that effectively suppress the phase noise in the oscillation signals. Such a long optical delay may be difficult to achieve electronically. The open loop gain for the opto-electronic loop is greater than the corresponding loss so an oscillation can be generated and sustained in the opto-electronic loop. The laser oscillation and the electrical oscillation are correlated with each other so that both the modes and stability of one oscillation are coupled with those of the other oscillation. The optical feedback loop or the laser cavity includes a gain medium to produce a loop gain greater than the optical loss in the laser cavity to effectuate and sustain the laser oscillation. This optical loop may be implemented by an optical resonator. The coupling between two feedback loops is achieved by controlling the loop gain of the optical loop by an electrical signal generated by the opto-electronic feedback loop. COEOs can achieve a single-mode RF or microwave oscillation without a RF or microwave bandpass filter or any additional opto-electronic feedback loops.

The coupled OEO 1600 in FIG. 16 has two coupled oscillating loops. The first oscillating loop is a laser ring loop similar to what is described in FIG. 15. The electro-optic resonator 1310 is used as the optical modulator for actively mode locking in the laser ring. In the ring, the total gain at the laser wavelength exceeds the optical loss so the laser oscillation at the laser wavelength can be generated and sustained. A second oscillation loop in FIG. 16 is formed by at least the resonator modulator 1310, the waveguide grating coupler, the coupler 1520, an optional optical delay element 1610, an optical detector 1620, an electrical feedback circuit 1630 (e.g., RF amplification and filtering), and the electrode coupler 1320. This second oscillating loop also has a loop gain greater than the total loss in the loop to generate and sustain an oscillation at the modulation frequency of the modulator 1310. The optional optical delay element 1610 may be an optical resonator such as a passive WGM resonator. These two oscillating loops are coupled to each other by the modulator 1310. This coupling is used here to achieve a compact actively mode-locked laser with high pulse repetition rate by generating the stable RF or microwave modulation signal through the opto-electronic loop. The transformation of the modulated light power into the RF or microwave signal is achieved via the photodetector 1620. Hence, the laser light energy is converted directly to spectrally pure RF or microwave signals, using an electro-optic feedback loop containing a high-Q optical element, at a frequency limited only by the available optical modulation and detection elements. This frequency is the repetition frequency of the optical pulses generated in the system.

Figure 17:
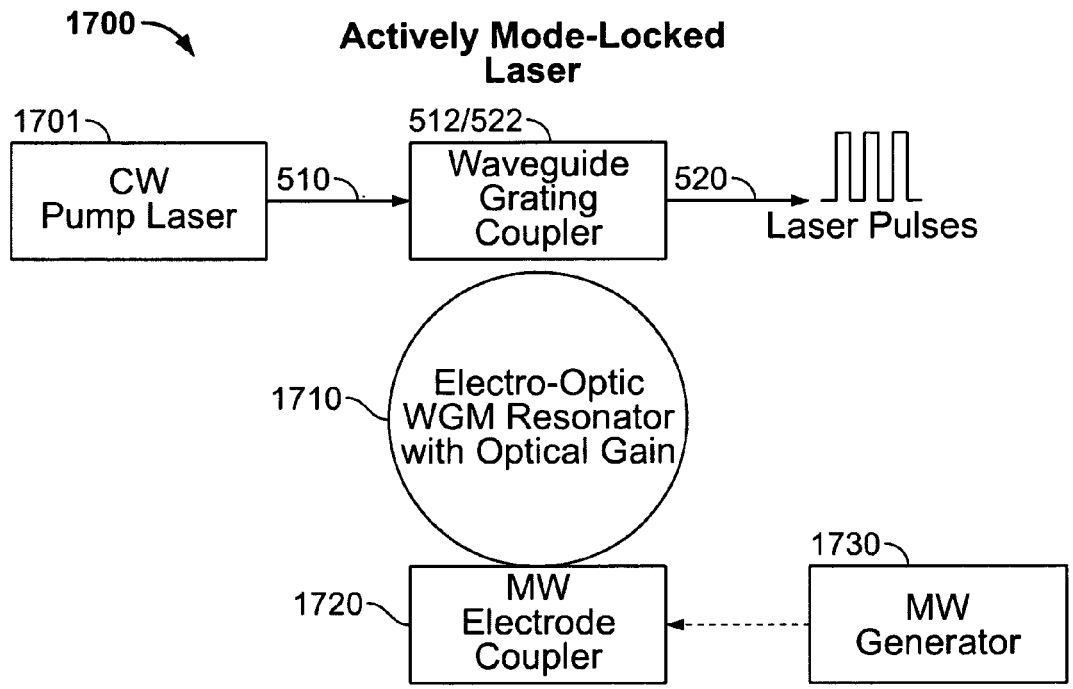

FIG. 17 shows one implementation of an active mode-locked laser 1700 using an electro-optic WGM resonator 1710 as both the modulator and the laser cavity. The WGM resonator 1710 produces both an electro-optic effect for active mode locking and an optical gain under proper optical pumping. In one implementation, the material for the WGM resonator may be an electro-optic material doped with active ions to produce the desired laser gain, such as Er-doped LiNbO3 crystals. In another implementation, the resonator 1710 may include a resonator core made from an electro-optic material and a thin active medium laser formed over the core with a thickness comparable to the volume occupied by the optical WGM modes for the laser light and the pump light. This design allows for separate selection of the electro-optic material and the laser gain material. For example, erbium-doped solgel films may be applied to the surface of lithium niobate cavity to create low-threshold microcavity mode-locked lasers. Silica microsphere lasers with applied solgel films were demonstrated. See, Yang et al., "Gain functionlization of silica microresonators," Optics Letters, Vol. 28, No. 8, pages 592–594 (April, 2003). In such a coated resonator 1710 for the laser 1700, the solgel generally does not reduce the quality factor of the microcavity significantly, while the erbium ions are coupled to the cavity modes via evanescent field.

The WGM resonator 1710 is optically pumped by a pump beam at a desired pump wavelength based on the active ions doped in the resonator material. A pump light source 1701 such as a laser is used to produce the optical pump beam. The resonator 1710 produces the optical gain at a laser wavelength, usually longer than the pump wavelength. The light at the laser wavelength generated by the active ions circulates and accumulates inside the resonator 1710 to build up laser oscillation in one or more WGM modes at the laser wavelength. The laser 1700 also includes electrodes 1720 to supple an electrical modulation signal from a control circuit 1730 such as a microwave signal generator. In operation, the modulation frequency of the signal from the control 1730 is tuned to a desired frequency to lock the laser modes. After the mode locking is established, the laser output 703 becomes laser pulses with a high pulse repetition rate.

Figure 18:
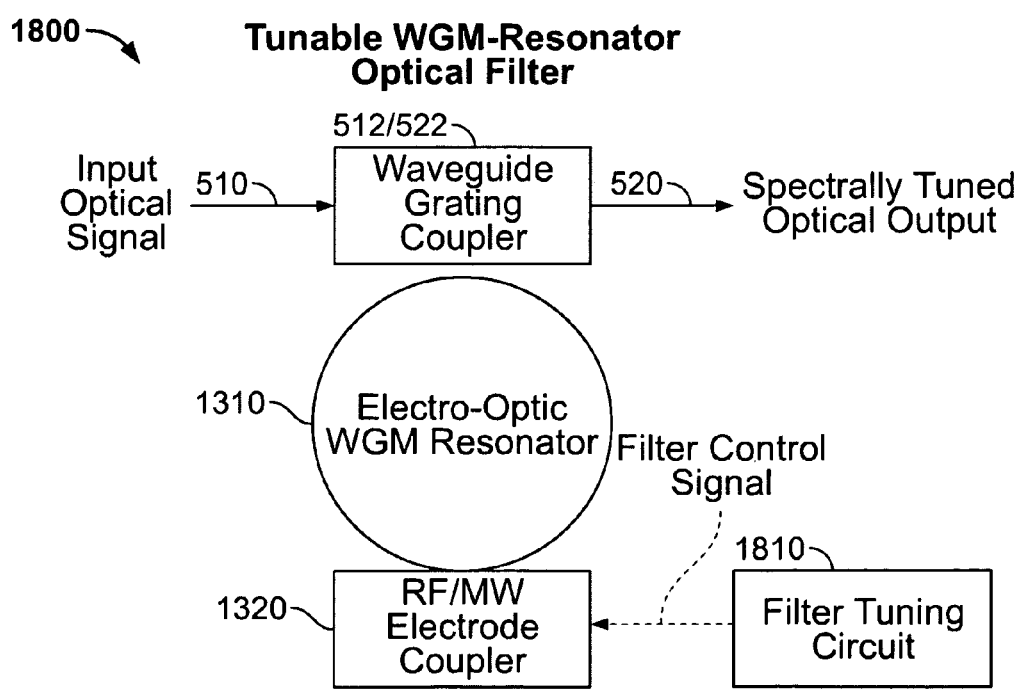

FIG. 18 further shows a tunable optical filter 1800 based on an electro-optic WGM resonator 1310 shown in FIG. 13. The electro-optic material for the entire or part of the resonator 1310 may be any suitable material, including an electro-optic crystal such as Lithium Niobate and semiconductor multiple quantum well structures. An electrode coupler 1320 may be formed on the resonator 1310 to apply a control electrical field in at least the region where the WG modes are present to control the index of the electro-optical material and to change the filter function of the resonator. In one implementation, the electrodes in the coupler 1320 may constitute an RF or microwave resonator to apply the RF or microwave signal to co-propagate along with the desired optical WG mode. A filter tuning circuit 1810 may be used to supply the electrical control signal.

In operating the filter 1800, the filter control unit 1810 may supply a voltage as the electrical control signal to the electrodes in the coupler 1320. In some operations, the control voltage may be a DC voltage to bias the transmission peak of the filter 1800 at a desired spectral location. The DC voltage may be adjusted by the control unit 1810 to tune the spectral position of the transmission peak when such tuning is needed. For dynamic tuning operations, the control unit 1810 adjusts the control voltage in response to a control signal to, e.g., maintain the transmission peak at a desired spectral position or frequency or to change the frequency of the transmission peak to a target position. In some other operations, the control unit 1810 may adjust the control voltage in a time varying manner, e.g., scanning the transmission peak at a fixed or varying speed or constantly changing the transmission peak in a predetermined manner.

In the above WGM resonators, the material for a WGM resonator may be uniform. In such resonators, the resonator dispersion increases as the resonator size decreases. This increased resonator dispersion in turn causes the unequal spectral separation between adjacent modes to increase. This undesired feature is rooted in the fact that the radial distribution of whispering-gallery resonant modes is dependent on the frequency of light in the WG modes. Higher frequency modes propagate on paths that are slightly closer to the surface than those of lower-frequency modes. Thus higher-frequency modes travel in trajectories of a slightly larger radius and slightly longer optical path lengths.

The optical path length of a mode by definition is a function of both the physical distance and the refractive index in the physical path of light. The WGM resonators may use a graded refractive index to modify both the refractive index and the physical location of a WG mode to produce optical spectra of WG modes that are different from the optical spectra produced by WGM resonators with uniform refractive indices. The graded refractive index is specially designed in order to produce mode spacings that are equal or substantially equal for different WG modes. In addition, the graded refractive index of such a WGM resonator may be designed to change the spatial confinement of the WG modes by shifting the spatial distribution of each WG mode away from the exterior surface of the resonator towards the interior of the resonator. Accordingly, the mode volumes of WG modes are increased and displaced away from the exterior surface of the resonator. This spatial shift in the mode location may be used to reduce the overall optical loss at the exterior surface caused by adverse effects of surface contamination and roughness and to achieve a high Q value closer to the high Q value of the resonator under ideal conditions. Furthermore, with the modal field being displaced deeper into the interior of the resonator, optimal coupling with an evanescent coupler, such as a prism or an angled-fiber tip, may be achieved by direct physical contact of the coupler with the resonator. This direct contact avoids the technical difficulties associated with maintaining the airgap between the coupler and a WGM resonator made of a dielectric material with a spatially uniform index profile.

The performance and range of applications based on WGM microcavities can be significantly expanded if a method is found to make microresonator modes equally spaced with precision corresponding to a fraction of the resonance bandwidth of a WGM resonator. Such a dielectric microresonator with an equidistant mode spectrum is similar to the spectrum of a typical Fabry-Perot resonator formed with two reflective mirrors. Such dielectric resonators with an equidistant spectrum may be used, for example, in frequency comb generators, optical pulse generators, broadband energy-storage circuits of electro-optical devices, and in other applications where conventional optical Fabry-Perot cavities are utilized.

This requirement of a gap can be problematic in device design and manufacture because the gap must be maintained at a critical angle and with a critical distance.

The WGM resonators with graded indices may be designed with a spatial gradient profile for the refractive index to shift the WG modes away from the exterior surface towards the interior of the resonator so that the optical coupler in direct contact with the exterior surface can be used to achieve the critical coupling condition without the air gap. In addition, this shift of the WG modes can also reduce optical loss caused by the scattering and absorption by the imperfections and contaminants on the exterior surface of the resonator. This reduced loss leads to high values in the Q factor.

The graded index profile for the WGM resonators, like the geometrical shapes of the resonators, may also have axially or cylindrically symmetric spatial profiles with respect to the same axis 101(z). According to one implementation, the graded index profile of such a WGM resonator should at least vary along the radial direction, i.e., $n=n(r)$ where $r=(x^2+y^2)^{1/2}$. This radial profile $n(r)$ may have different configurations. In one configuration, for example, the index changes with r throughout the entire resonator from the most inner part where r is at its minimum to the exterior surface where r is at its maximum at each given z within the resonator. The graded index is used here to modify the WG modes and thus it may suffice to have the graded profile only at the outer portion of the resonator because the WG modes are centered near the exterior surface of the resonator. Therefore, in another exemplary configuration, the index may be set at a predetermined constant $n_o$ along the radial direction at the inner part of the resonator but have a radial variation at the outer part of the resonator: $n=n_o+n_r(r)$, where $n_r(r)=0$ when $r<r_o$ and varies with r when $r \geq r_o$. The $r_o$ and the gradient function $n_r(r)$ are selected to place the center of each WG mode where the mode strength is maximum at a desired location away from the exterior surface.

In general, the graded index n(r) or the gradient portion $n_r(r)$ decreases as r increases in order to place the center of each WG mode away from the exterior surface of the resonator. In other applications such as sensing based on WGM resonators, the graded index n(r) or the gradient portion $n_r(r)$ increases as r increases. Such graded index design may be implemented in the waveguide-grating coupled WGM resonators and devices using such WGM resonators.

Only a few implementations are disclosed. However, it is understood that variations and enhancements may be made.

What is claimed is:

1. A device, comprising:
   a first waveguide having a first expanded section that has a first diffractive grating;
   a second waveguide having a second expanded section that has a second diffractive grating, wherein the second expanded section is located adjacent to and is separated from the first expanded section and is not optically coupled to each other; and
   an optical resonator located near the first and second expanded sections and optically coupled to the first and second waveguides via the first and the second diffractive gratings, respectively,
   wherein the optical resonator supports whispering gallery modes and is in resonance with the first and the second diffractive gratings.

2. A device as in claim 1, wherein the optical resonator is a silica micro resonator.

3. A device as in claim 1, wherein the optical resonator is a sapphire micro resonator.

4. A device as in claim 1, wherein the optical resonator is a lithium niobate micro resonator.

5. A device as in claim 1, where each of the first and second diffractive gratings has a grating period at a value between 0.5 micron to 3 microns.

6. A device as in claim 1, wherein a width of the first and second expanded sections is from 2 to 10 microns for light at a wavelength of 1550 nm.

7. A device as in claim 1, wherein the first and the second waveguides comprise Si.

8. A device as in claim 1, wherein the first and the second waveguides comprise InP.

9. A device as in claim 1, wherein the first expanded section includes a corrugated surface to effectuate the first diffractive grating.

10. A device as in claim 1, further comprising a substrate on which the first and the second waveguides are formed.

11. A device as in claim 1, wherein the first and second waveguides are arranged relative to each other in a counter-directional configuration and have a common grating period.

12. A device as in claim 1, wherein the first and second waveguides are arranged relative to each other in a co-directional configuration and have different grating periods.

13. A device, comprising:
    a waveguide;
    a waveguide mode expander having a tapered shape with a narrow end coupled to one end of the waveguide and a broad end;
    an expanded section coupled to the broad end of the waveguide mode expander and having a periodic grating structure; and
    a whispering gallery mode resonator located near the grating structure to optically couple an evanescent field of a mode of the resonator to the grating structure.

14. A device as in claim 13, wherein the grating structure comprises grating grooves whose groove depths change along the direction of the grating structure.

15. A device as in claim 14, wherein the grating structure is in an elliptical shape and wherein the elliptical shape and the groove depths of the grating structure form a two-dimensional Gaussian profile.

16. A device as in claim 13, wherein the grating structure is in an elliptical shape and wherein the elliptical shape of the grating structure coincides with a spatial profile of the evanescent field of the mode of the resonator at the grating structure.

17. A device as in claim 13, further comprising:
    a second waveguide;
    a second waveguide mode expander having a tapered shape with a narrow end coupled to one end of the second waveguide and a broad end; and
    a second expanded section coupled to the broad end of the second waveguide mode expander and having a second periodic grating structure,
    wherein the second expanded section is located close to the expanded section of the waveguide.

18. A device as in claim 17, wherein each grating structure comprises grating grooves whose groove depths change along the direction of the grating structure.

19. A device as in claim 17, further comprising a whispering gallery mode resonator located near the expanded and the second expanded sections to optically couple an evanescent field of a mode of the resonator to the waveguide and the second waveguide.

20. A device as in claim 19, wherein the grating structure of the waveguide and the grating structure of the second waveguide are shaped to have a combined profile which coincides with a spatial profile of the evanescent field of the mode of the resonator at the grating structures.

21. A device as in claim 17, wherein said second periodic grating structure has a grating period different from a grating period of the grating structure.

22. A device as in claim 17, wherein each of the grating structure and the second grating structure is in an elliptical shape.

23. A device as in claim 13, wherein the resonator comprises at least a portion a a sphere.

24. A device as in claim 13, wherein the resonator comprises at least a portion of a spheroid.

25. A device as in claim 13, wherein the resonator is a disk-shaped resonator.

26. A device as in claim 13, wherein the resonator is a ring resonator.

27. A device as in claim 1, wherein the resonator is a non-spherical resonator.

28. A device as in claim 1, wherein the resonator comprises at least a portion of a sphere.

29. A device as in claim 1, wherein the resonator comprises at least a portion of a spheroid.

30. A device as in claim 1, wherein the resonator is a disk-shaped resonator.

* * * * *